US012628982B1

(12) United States Patent
Brod

(10) Patent No.: US 12,628,982 B1
(45) Date of Patent: May 19, 2026

(54) ROTATING SKEWER RACKS

(71) Applicant: Levi Brod, Brooklyn, NY (US)

(72) Inventor: Levi Brod, Brooklyn, NY (US)

(*) Notice: Subject to any disclaimer, the term of this patent is extended or adjusted under 35 U.S.C. 154(b) by 759 days.

(21) Appl. No.: 18/087,960

(22) Filed: Dec. 23, 2022

(51) Int. Cl.
*A47J 37/04* (2006.01)

(52) U.S. Cl.
CPC .................................. *A47J 37/041* (2013.01)

(58) Field of Classification Search
CPC . A47J 37/041; A47J 2037/0777; F24B 1/202; A47B 41/02
See application file for complete search history.

(56) References Cited

U.S. PATENT DOCUMENTS

| | | | | |
|---|---|---|---|---|
| 2,939,384 A | * | 6/1960 | Vinson ................ | A47J 37/0763 126/9 R |
| 4,541,406 A | * | 9/1985 | DaSambiagio ......... | F24B 1/205 99/446 |
| 5,848,584 A | * | 12/1998 | Brog ...................... | A47J 33/00 126/30 |
| 7,856,924 B1 | * | 12/2010 | Stihi .................... | A47J 37/0731 126/25 AA |
| 7,984,709 B1 | * | 7/2011 | Bymes ................ | A47J 37/0704 126/250 |
| 10,527,221 B2 | * | 1/2020 | Grappe ................. | B62B 5/0033 |
| 2014/0265186 A1 | * | 9/2014 | Witzel .................. | A47J 37/049 280/35 |
| 2023/0025014 A1 | * | 1/2023 | Perry .................. | A47J 37/0704 |

* cited by examiner

*Primary Examiner* — Edward F Landrum
*Assistant Examiner* — Drew Joseph Mitchum

(57) ABSTRACT

Rotating skewer racks are disclosed. The racks include a front plate and a back plate, with such plates being connected through a pair of interconnected rods that are configured to collapse (to move the plates closer together) and to expand (to move the plates away from each other). The racks are configured to allow the front and back plates to exert a desired amount of compression force on food that is attached to the skewers. In addition, the racks include a rotating handle and a sliding skewer track, which are operably connected to each other through a gear connected to the handle. When the handle is rotated, the handle and its connected gear are configured to cause the sliding skewer track to move, which in turn rotates a set of skewers that rest on and make contact with the top side of the sliding skewer track.

2 Claims, 7 Drawing Sheets

40

36

38

38

36

40

42

42

12                                                                10

ROTATING SKEWER RACKS

FIELD OF THE INVENTION

The field of the present invention relates to skewer racks. More particularly, the field of the present invention relates to improved rotating skewer racks.

BACKGROUND OF THE INVENTION

Many grilling enthusiasts use skewers to cook meat, fish, vegetables, fruits, and other foods—such foods are often grilled together when preparing kabobs. Of course, skewers are long/linear rods that are configured to pierce and hold such foods over a grilling surface, preferably in a way that avoids contact between the food and the grilling surface. Skewers are typically held over a grilling surface using any of a variety of commercially available devices and skewer racks. It is generally important to rotate the skewers (and the food attached thereto) during grilling, to allow the food to be evenly and thoroughly cooked on all sides.

One challenge with rotating skewers is—after rotating the skewer—the food alone will often rotate back to its previous position (about the axis of the skewer disposed through the food). In other words, if there is any asymmetry in the weight distribution of the food attached to the skewer (which is often the case), gravitational forces encourage the food alone to rotate about the axis of the skewer to orient the heaviest portion of the food at the bottom. This creates challenges in keeping food rotated and held in a desired position when grilling with skewers. In addition, when grilling with multiple skewers on a typical skewer rack, the skewers must be rotated individually, which creates additional work when grilling. Accordingly, there continues to be a need in the grilling and cooking industry to improve the efficiency of skewer racks by controlling the rotation of multiple skewers at the same time.

As the following will demonstrate, the rotating skewer racks described and claimed herein address these continued and unmet needs in the marketplace.

SUMMARY OF THE INVENTION

According to certain aspects of the invention, improved rotating skewer racks are provided. The skewer racks of the present invention generally include a front plate and a back plate, with such plates being connected through a pair of intersecting rods that are configured to fold on each other and collapse (to move the plates closer together) and to expand (to move the plates away from each other). The skewer racks are configured to allow the front and back plates to exert a desired amount of compression force on food that is attached to a set of skewers that are resting on the front plate and back plate—i.e., to gently compress the food together and prevent unwanted movement and rotation of the food while being cooked on a set of skewers. In addition, the racks include a rotating handle and a sliding skewer track, which are operably connected to each other through a gear connected to the handle. The invention provides that, when the handle is rotated, the handle and its connected gear are configured to cause the sliding skewer track to move laterally across the front plate, which in turn rotates a set of skewers that rest on and make contact with a top side of the sliding skewer track.

More particularly, according to such aspects of the invention, the top surfaces of the front plate and back plate each have a plurality of open-ended slots. The rotating skewer racks include a plurality of skewers, each having a linear rod, a grip, and a skewer gear positioned adjacent to the grip. The linear rods of the multiple skewers are configured to sit within a corresponding pair of the open-ended slots, located on the top surfaces of the front and back plates. As mentioned above, the invention further includes a sliding skewer track that is connected to the front plate. The invention provides that a top surface of the sliding skewer track includes a first set of equally-spaced indentations, which are configured to receive and mate with a set of teeth located around the perimeter of each of the skewer gears.

According to such aspects of the invention, a bottom surface of the sliding skewer track includes a second set of equally-spaced indentations. As mentioned above, the rotating skewer racks include a rotating handle having a handle portion and a handle gear that includes a second set of teeth located around a perimeter of the handle gear, which are configured to be received by and mate with the equally-spaced indentations located on the bottom surface of the sliding skewer track. The invention provides that manual rotation of the rotating handle from a right side of the front plate to a left side of the front plate causes the handle gear to engage with the second set of equally-spaced indentations on the bottom surface of the sliding skewer track; the sliding skewer track to slide towards the left side of the front plate; the skewer gears of the multiple skewers to engage with the first set of equally-spaced indentations on the top surface of the sliding skewer track; and the multiple skewers to then rotate (clockwise) in sequence within each of the plurality of open-ended slots. Conversely, the invention provides that manual rotation of the rotating handle from a left side of the front plate to a right side of the front plate causes the sliding skewer track to slide towards the right side of the front plate, thereby causing the operably connected skewers to rotate counterclockwise.

According to yet additional aspects of the invention, the rotating skewer racks further include a first support rod connected to a left side of the back plate through a first hinge joint and to the right side of the front plate through a second hinge joint. In addition, the rotating skewer racks include a second support rod connected to a right side of the back plate through a third hinge joint and to the left side of the front plate through a fourth hinge joint. Still further, the rotating skewer racks include a central hinge joint that connects the first support rod and the second support rod near a center portion thereof. The invention provides that such configuration allows the back plate to be manually moved towards the front plate (whereupon the first support rod and the second support rod collapse and fold towards each other) and to be manually moved away from the front plate (whereupon the first support rod and the second support rod expand).

According to such aspects of the invention, the rotating skewer racks preferably include a first slidable arm connected to the fourth hinge joint of the left side of the front plate and a second slidable arm connected to the first hinge joint of the left side of the back plate. In such embodiments, the invention provides that manually pulling the first slidable arm and/or second slidable arm away from the front plate and/or back plate (i.e., away from the left side of the front plate and/or back plate), respectively, causes the first support rod and the second support rod to collapse and fold towards each other, thereby causing the back plate to move towards the front plate. Conversely, manually pushing the first slidable arm and/or second slidable arm towards the left sides of the front plate and/or back plate, respectively, causes the first support rod and the second support rod to expand, thereby causing the back plate to move away the front plate.

The above-mentioned and additional features of the present invention are further illustrated in the Detailed Description contained herein.

DETAILED DESCRIPTION OF THE INVENTION

Figure 1:
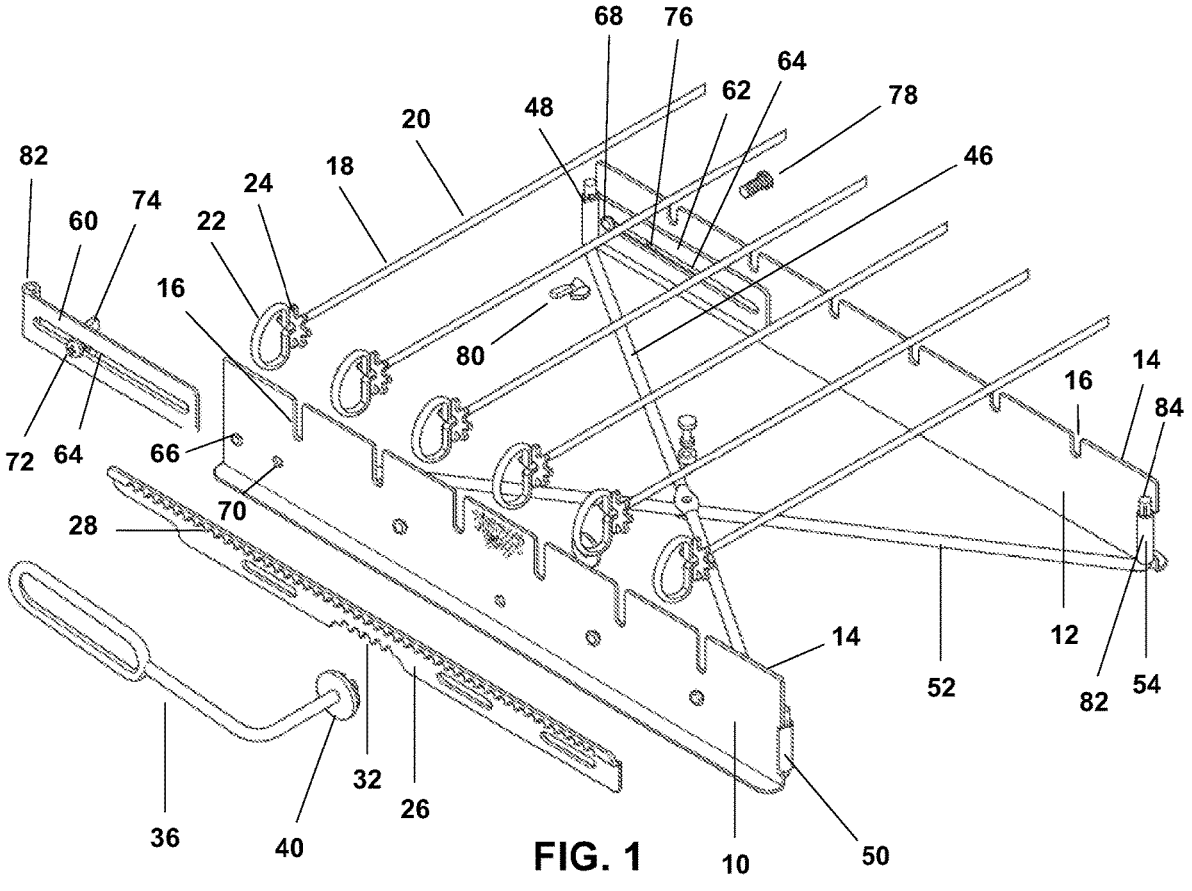
FIG. 1: a top, disassembled, perspective view of the rotating skewer rack of the present invention.
Figure 2:
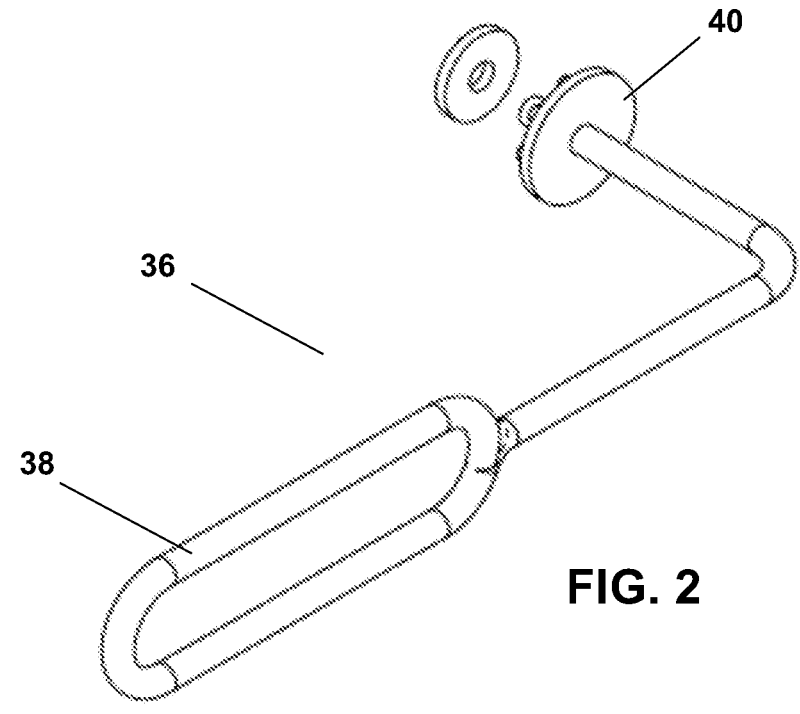
FIG. 2: a top, disassembled, perspective view of the rotating handle.
Figure 3:
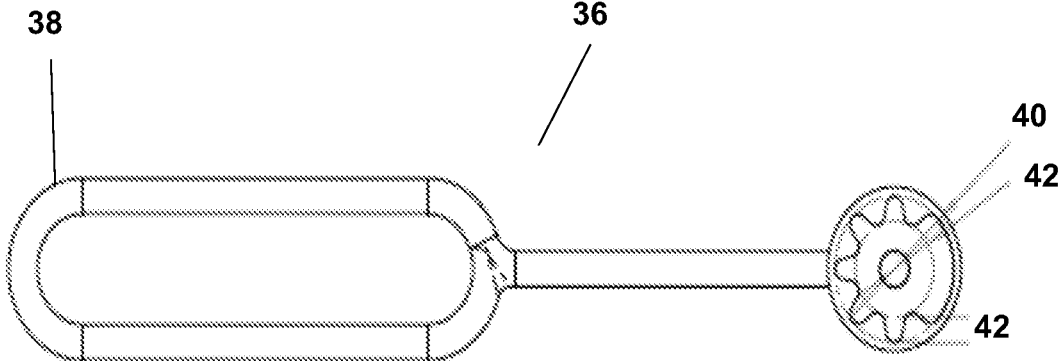
FIG. 3: a side view of the rotating handle.
Figure 4:
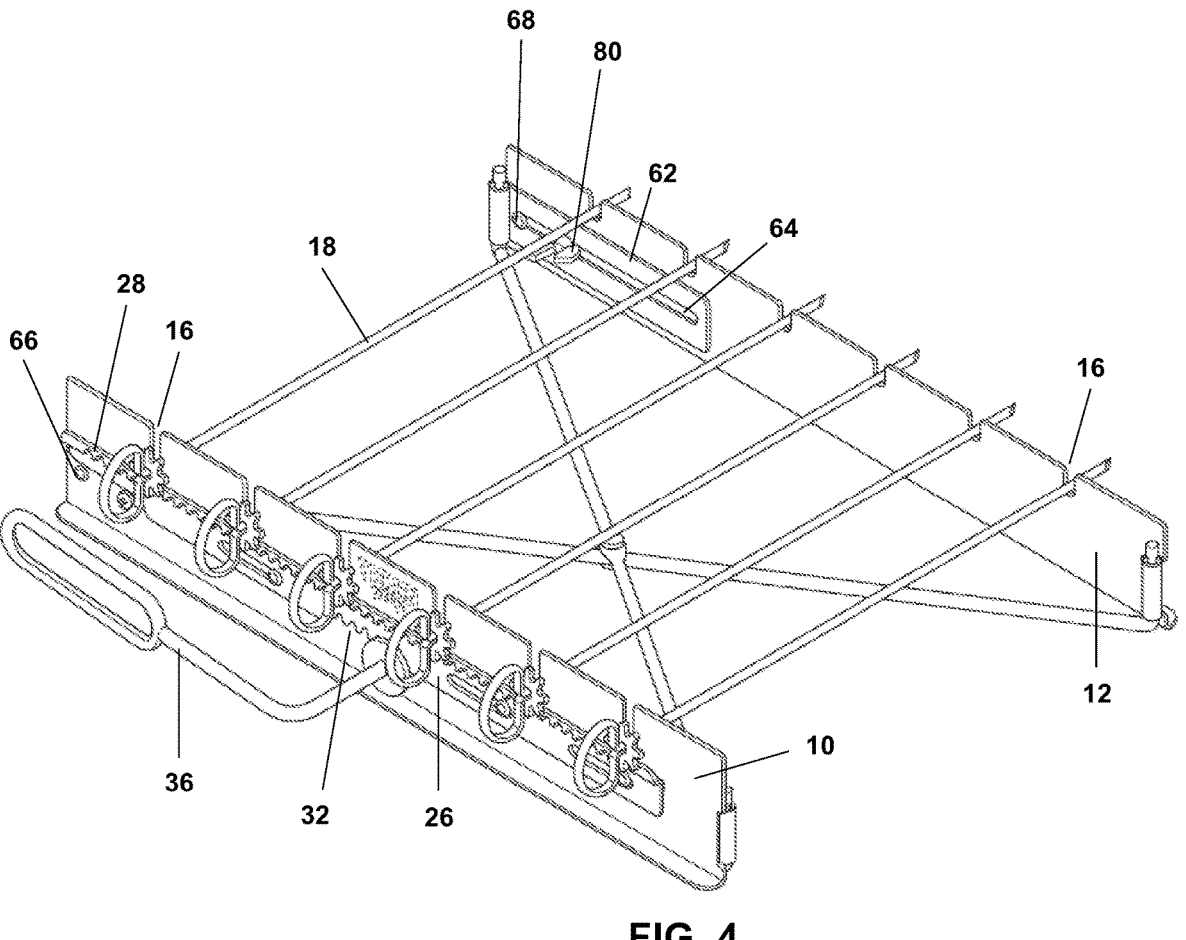
FIG. 4: a top, assembled, perspective view of the rotating skewer rack of the present invention.

The following will describe, in detail, several preferred embodiments of the present invention. These embodiments are provided by way of explanation only, and thus, should not unduly restrict the scope of the invention. In fact, those of ordinary skill in the art will appreciate upon reading the present specification and viewing the present drawings that the invention teaches many variations and modifications, and that numerous variations of the invention may be employed, used, and made without departing from the scope and spirit of the invention.

Referring now to FIGS. 1-9, according to certain preferred embodiments of the present invention, rotating skewer racks are provided. More particularly, the rotating skewer racks include a front plate 10 and a back plate 12, with the top surface 14 of each of the front plate 10 and back plate 12 including a plurality of open-ended slots 16. The rotating skewer racks of the present invention include a plurality of skewers 18, with each of the skewers 18 having a linear rod 20, a grip 22, and a skewer gear 24 positioned adjacent to the grip 22. The invention provides that the linear rod 20 of each skewer 18 is configured to sit within a corresponding pair of the open-ended slots 16 (FIG. 4), located on the top surfaces 14 of the front plate 10 and the back plate 12, i.e., a pair of the open-ended slots 16 that are positioned directly opposite of each other on the front plate 10 and the back plate 12. The linear rod 20 of each skewer 18 is allowed to freely rotate when positioned within the pair of open-ended slots 16.

Figure 5:
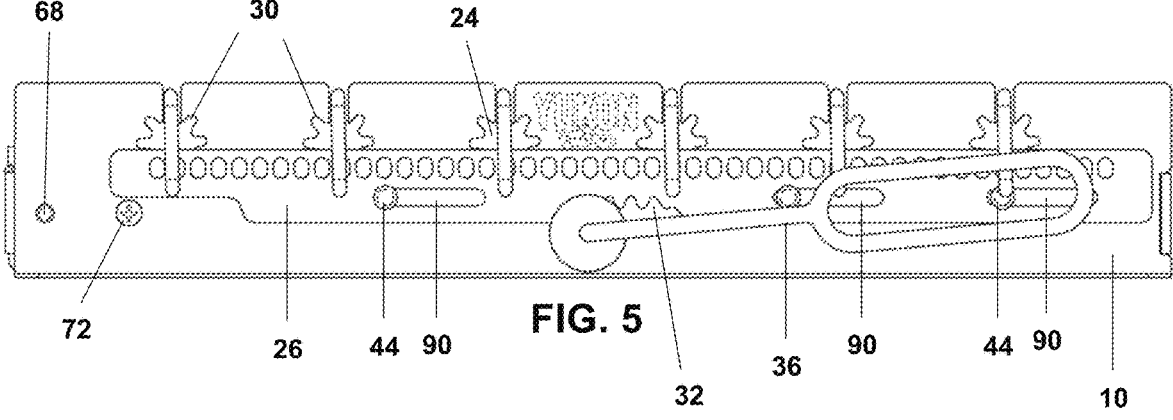
FIG. 5: a front view of the rotating skewer rack, with the rotating handle positioned near the right side of the skewer rack.

According to certain preferred embodiments of the present invention, the rotating skewer racks include a sliding skewer track 26 connected to the front plate 10, such as to the front of the sliding skewer track 26. The invention provides that a top surface of the sliding skewer track 26 includes a first set of equally-spaced indentations 28 (FIGS. 1 and 3), with each of the equally-spaced indentations 28 configured to receive and mate with a set of teeth 30 located around a perimeter of each of the skewer gears 24 (FIG. 5). In addition, the invention provides that a bottom surface of the sliding skewer track 26 includes a second set of equally-spaced indentations 32, which are operably coupled to the rotating handle 36 as described below.

Figure 6:
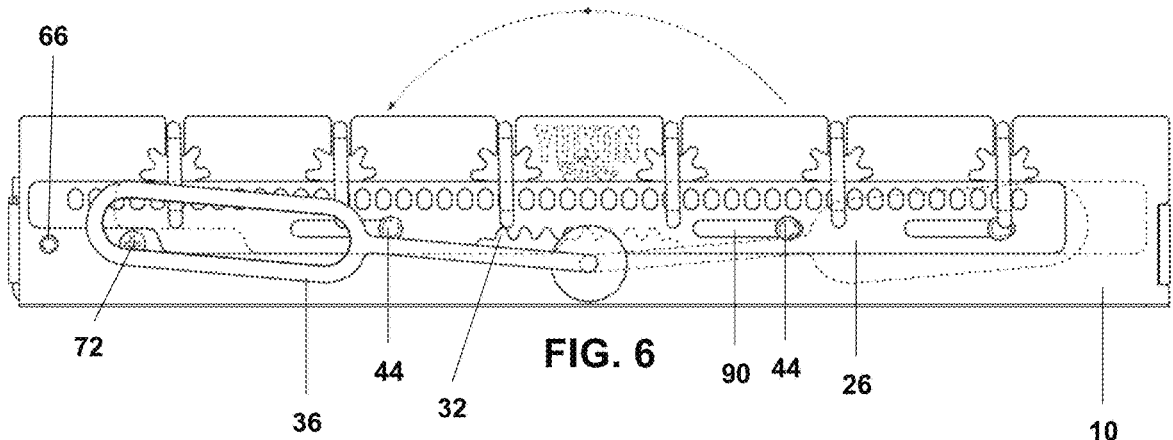
FIG. 6: another front view of the rotating skewer rack, with the rotating handle positioned near the left side of the skewer rack.
Figure 7:
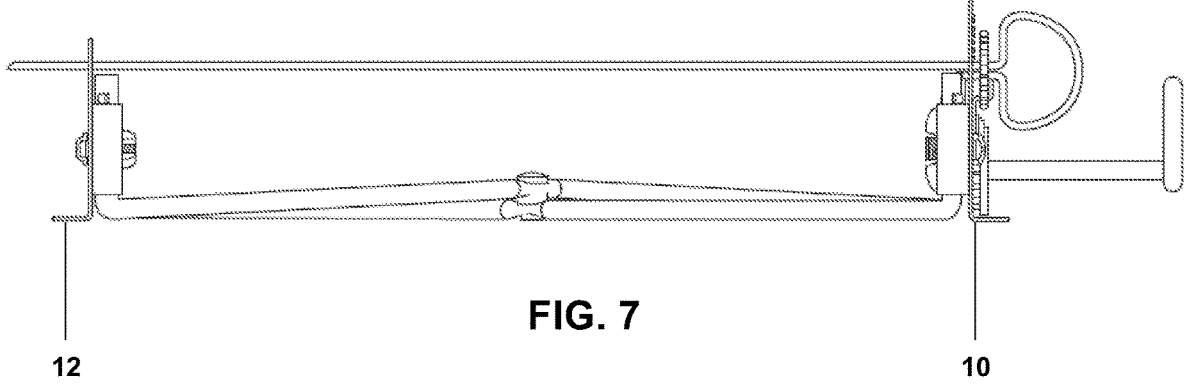
FIG. 7: a side view of the rotating skewer rack of the present invention.

Still further, according to such preferred embodiments, the rotating skewer racks include a rotating handle 36 that comprises a handle portion 38 and a handle gear 40. The invention provides that the handle gear 40 includes a second set of teeth 42 located around the perimeter of the handle gear 40 that are figured to be received by and mate with the equally-spaced indentations 32 located on the bottom surface of the sliding skewer track 26. Referring now to FIGS. 5 and 6, the invention provides that manual rotation of the rotating handle 36 from a right side of the front plate 10 (FIG. 5) to a left side of the front plate 10 (FIG. 6) causes the second set of teeth 42 of the handle gear 40 to engage with the second set of equally-spaced indentations 32 on the bottom surface of the sliding skewer track 26. Such engagement causes the sliding skewer track 26 to slide laterally towards the left side of the front plate 10 (FIG. 6); the skewer gears 24 of the plurality of skewers 18 to engage with the first set of equally-spaced indentations 28 on the top surface of the sliding skewer track 26; and the plurality of skewers 18 to rotate clockwise within each of the plurality of open-ended slots 16 (in response to the engagement of the skewer gears 24 and lateral movement of the sliding skewer track 26). The engagement of the second set of teeth 42 of the handle gear 40—with the second set of equally-spaced indentations 32 on the bottom surface of the sliding skewer track 26—is similar to the type of engagement that is observed between two rotating gears, i.e., rotation of the handle gear 40 causes the second set of teeth 42 to consecutively engage with a series of equally-spaced indentations 32 and to force the lateral movement of the sliding skewer track 26. Likewise, the engagement of the set of teeth 30 of the skewer gears 24 with the first set of equally-spaced indentations 28 on the top surface of the sliding skewer track 26—coupled with the lateral sliding movement of the sliding skewer track 24—forces the rotation of the plurality of skewers 18 within the plurality of open-ended slots 16.

According to such embodiments, the invention provides that the sliding skewer track 26 includes one or more channels 90 that are parallel with and reside between the top surface and the bottom surface of the sliding skewer track 26. The invention provides that the one or more channels 90 are configured to receive and slide along a set of protruding elements 44 located on a front surface of the front plate 10. In certain embodiments, the set of protruding elements 44 are a set of rivets.

Figure 8:
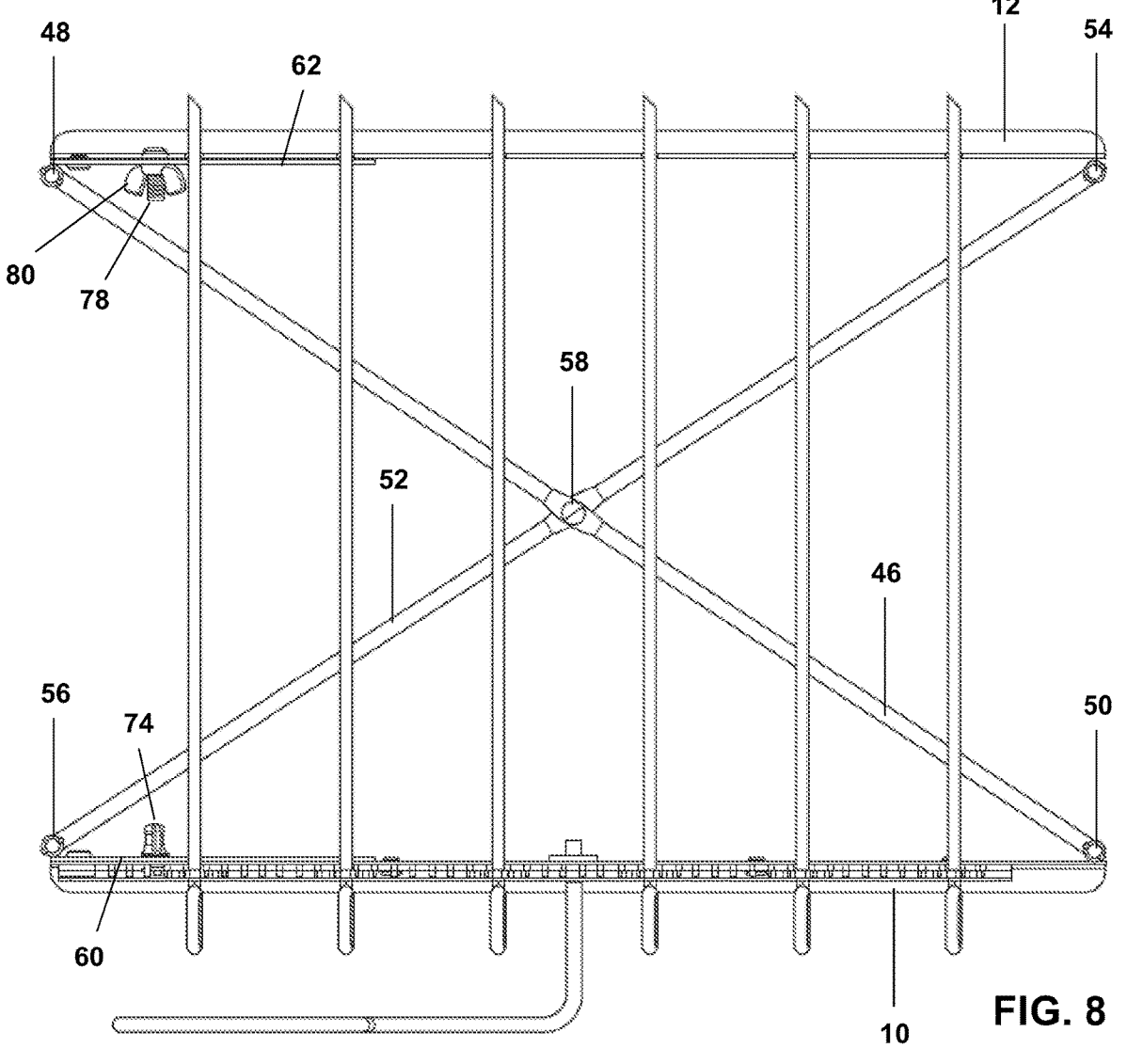
FIG. 8: a top view of the rotating skewer rack of the present invention, showing the first support rod and the second support rod in an expanded orientation.
Figure 9:
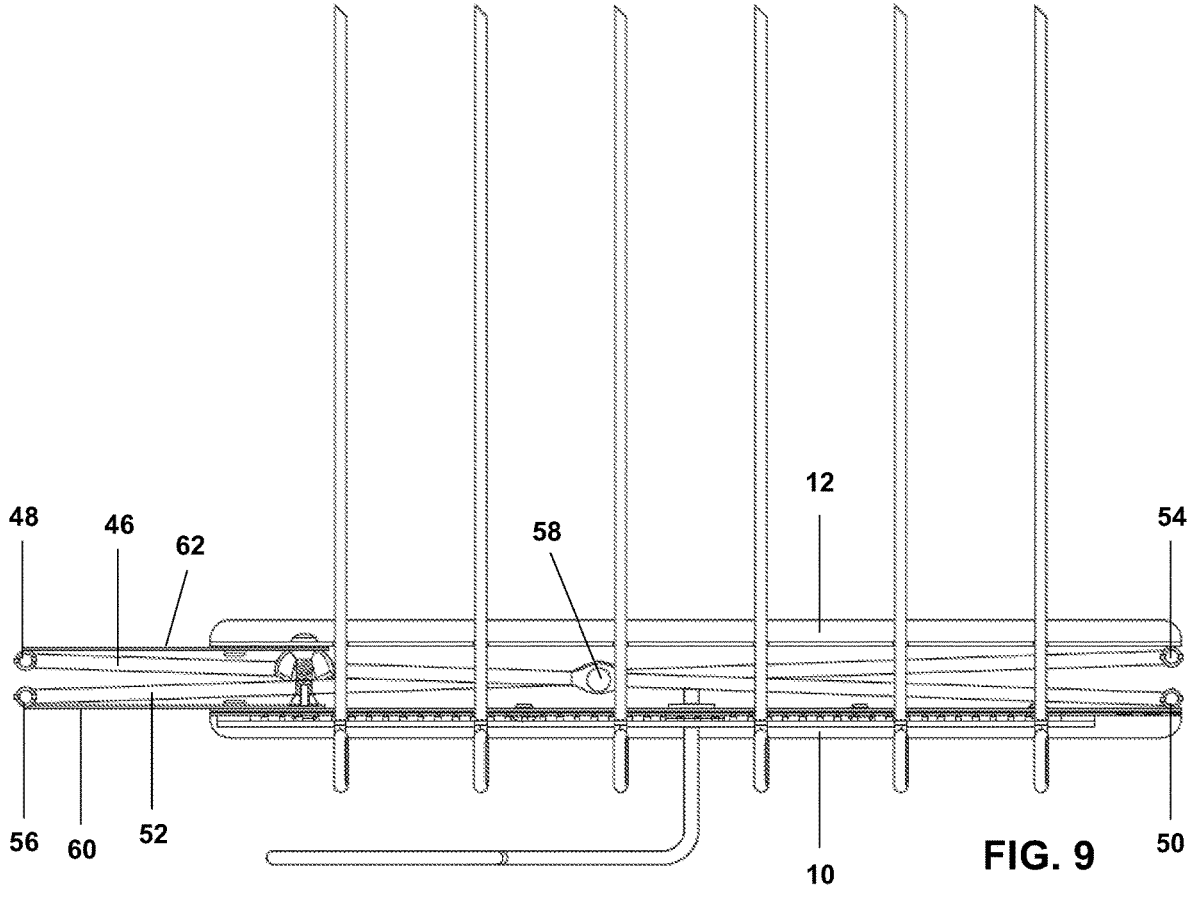
FIG. 9: a top view of the rotating skewer rack of the present invention, showing the first support rod and the second support rod in a fully collapsed and folded orientation.

Referring now to FIGS. 8 and 9, according to yet further preferred embodiments of the present invention, the rotating skewer racks include a set of interconnected support rods that are configured to fold and expand as desired, for the purpose of moving the back plate 12 closer to and away from the front plate 10, as desired. More particularly, the rotating skewer racks include a first support rod 46 connected to a left side of the back plate 12 through a first hinge joint 48 and to the right side of the front plate 10 through a second hinge joint 50. In addition, the rotating skewer racks include a second support rod 52 connected to a right side of the back plate 12 through a third hinge joint 54 and to the left side of the front plate 10 through a fourth hinge joint 56. Still further, the rotating skewer racks include a central hinge joint 58 that connects the first support rod 46 and the second support rod 52 near a center portion of each of the first support rod 46 and the second support rod 52. The invention provides that the first hinge joint 48, second hinge joint 50, third hinge joint 54, and fourth hinge joint 56 may comprise a hollow sleeve or cylinder 82, which receives and allows rotation of a rotating element 84 that is connected to or integrally formed with each end of the first support rod 46 and the second support rod 52. For example, such rotating element 84 may consist of a portion of the first support rod 46 and the second support rod 52 that is bent upwards and configured to be inserted into the hollow sleeve or cylinder 82 (FIG. 1).

As mentioned above, the invention provides that the back plate 12 is configured to be manually moved towards the front plate 10. Movement of the back plate 12 towards the front plate 10 is facilitated by the first hinge joint 48, second hinge joint 50, third hinge joint 54, fourth hinge joint 56, and central hinge joint 58. More particularly, the invention provides that when the first support rod 46 and the second support rod 52 are forced to collapse and fold towards each other (with such folding being enabled by the first hinge joint 48, second hinge joint 50, third hinge joint 54, fourth hinge joint 56, and central hinge joint 58), the back plate 12 is forced to move towards the front plate 10 (FIGS. 8 and 9). Conversely, the invention provides that manually forcing the first support rod 46 and the second support rod 52 to expand causes the back plate 12 to move away from the front plate 10. The invention provides that the back plate 12 is configured to be manually positioned at any desired location in relation to the front plate 10, along the axis of the skewer rods 20. Such feature allows the back plate 12 to be manually positioned at a location in relation to the front plate 10, which is effective to exert a desired amount of force on the food that is attached to each of the skewers 18.

In certain preferred embodiments, the rotating skewer racks further include a first slidable arm 60 connected to the fourth hinge joint 56 of the left side of the front plate 10 and a second slidable arm 62 connected to the first hinge joint 48 of the left side of the back plate 12. The invention provides that manually pulling the first slidable arm 60 and/or the second slidable arm 62 away from the front plate 10 and/or back plate 12 (i.e., away from the left sides of the front plate 10 and/or back plate 12), respectively, causes the back plate 12 to move towards the front plate 10 and the first support rod 46 and the second support rod 52 to collapse and fold towards each other (FIG. 9). Conversely, the invention provides that manually pushing the first slidable arm 60 and/or second slidable arm 62 towards the front plate 10 and/or back plate 12, respectively, causes the back plate 12 to move away the front plate 10 and the first support rod 46 and the second support rod 52 to expand (FIG. 8).

According to yet further embodiments of the present invention, the first slidable arm 60 and the second slidable arm 62 each include a channel 64 that is parallel with and resides between a top surface and a bottom surface of each slidable arm 60/62. The invention provides that the channel 64 of the first slidable arm 60 is configured to receive and slide along a protruding element 66 located on an inside surface of the front plate 10 and the channel 64 of the second slidable arm 62 is configured to receive and slide along a protruding element 68 located on an inside surface of the back plate 12. Such protruding elements 66/68 may consist of, for example, a pair of rivets.

The invention further provides that the rotating skewer racks may further include a first aperture 70 located within the front plate 10 that is contiguous with the channel 64 of the first slidable arm 60. The invention provides that a first threaded screw 72 is configured to be disposed through the first aperture 70 and the channel 64 of the first slidable arm 60 and to receive a first nut 74, such that the first nut 74 may be rotated around the first threaded screw 72 in order to tighten and immobilize the first slidable arm 60 in a desired location on the front plate 10. Similarly, the invention provides that a second aperture 76 is preferably located within the back plate 12 that is contiguous with the channel 64 of the second slidable arm 62. The invention provides that a second threaded screw 78 is configured to be disposed through the second aperture 76 and the channel 64 of the second slidable arm 62 and to receive a second nut 80, such that the second nut 80 may be tightened around the second threaded screw 78 to immobilize the second slidable arm 62 in a desired location on the back plate 12.

The invention provides that the rotating skewer racks of the present invention may be constructed from any suitable material(s). Of course, such material(s) will need to be compatible with the high temperatures associated with grilling. Non-limiting examples of such materials include stainless steel, aluminum, and other metals and alloys that are routinely used to form grilling appliances.

The many aspects and benefits of the invention are apparent from the detailed description, and thus, it is intended for the following claims to cover all such aspects and benefits of the invention which fall within the scope and spirit of the invention. In addition, because numerous modifications and variations will be obvious and readily occur to those skilled in the art, the claims should not be construed to limit the invention to the exact construction and operation illustrated and described herein. Accordingly, all suitable modifications and equivalents should be understood to fall within the scope of the invention as claimed herein.

What is claimed is:

1. A rotating skewer rack, which comprises:
    (a) a front plate and a back plate, wherein a top surface of each of the front plate and back plate includes a plurality of open-ended slots;
    (b) a plurality of skewers, each having a linear rod, a grip, and a skewer gear positioned adjacent to the grip, wherein the linear rod of each skewer is configured to sit within a corresponding pair of the plurality of open-ended slots, located on the front plate and the back plate;
    (c) a sliding skewer track connected to the front plate, wherein (i) a top surface of the sliding skewer track includes a first set of equally-spaced indentations, with each of the equally-spaced indentations configured to receive and mate with a set of teeth located around a perimeter of each of the skewer gears and (ii) a bottom surface of the sliding skewer track includes a second set of equally-spaced indentations; and
    (d) a rotating handle having a handle portion and a handle gear that includes a second set of teeth located around a perimeter of the handle gear that are configured to be received by and mate with the equally-spaced indentations located on the bottom surface of the sliding skewer track, wherein manual rotation of the rotating handle from a right side of the front plate to a left side of the front plate causes: (i) the handle gear to engage with the second set of equally-spaced indentations on the bottom surface of the sliding skewer track, (ii) the sliding skewer track to slide towards the left side of the front plate, (iii) the skewer gears of the plurality of skewers to engage with the first set of equally-spaced indentations on the top surface of the sliding skewer track, and (iv) the plurality of skewers to rotate clockwise within each of the plurality of open-ended slots;

(e) a first support rod connected to a left side of the back plate through a first hinge joint and to the right side of the front plate through a second hinge joint;

(f) a second support rod connected to a right side of the back plate through a third hinge joint and to the left side of the front plate through a fourth hinge joint; and (g) a central hinge joint that connects the first support rod and the second support rod near a center portion of each of the first support rod and the second support rod, wherein the back plate is configured to be manually moved towards the front plate and also away from the front plate through movement of the first support rod and the second support rod;

(h) a first slidable arm connected to the fourth hinge joint of the left side of the front plate;

(i) a second slidable arm connected to the first hinge joint of the left side of the back plate, wherein manually pulling the first slidable arm and/or second slidable arm away from the front plate and/or back plate, respectively, causes the back plate to move towards the front plate and manually pushing the first slidable arm and/or second slidable arm towards the front plate and/or back plate, respectively, causes the back plate to move away the front plate, wherein:

(1) the sliding skewer track further includes one or more channels that are parallel with and reside between the top surface of the sliding skewer track and the bottom surface of the sliding skewer track, wherein each channel within the one or more channels is configured to receive and slide along a protruding element located on a front surface of the front plate; and

(2) the first slidable arm and the second slidable arm each include a channel that is parallel with and resides between a top surface and a bottom surface of each slidable arm, wherein the channel of the first slidable arm is configured to receive and slide along a second protruding element located within the front plate and the channel of the second slidable arm is configured to receive and slide along a third protruding element located within the back plate, wherein the rotating skewer rack further includes:

(i) a first aperture located within the front plate that is contiguous with the channel of the first slidable arm;

(k) a first threaded screw and a first nut, wherein the first threaded screw is configured to be disposed through the first aperture and the channel of the first slidable arm and to receive the first nut, wherein the first nut may be tightened to immobilize the first slidable arm in a desired location on the front plate;

(l) a second aperture located within the back plate that is contiguous with the channel of the second slidable arm; and (m) a second threaded screw and a second nut, wherein the second threaded screw is configured to be disposed through the second aperture and the channel of the second slidable arm and to receive the second nut, wherein the second nut may be tightened to immobilize the second slidable arm in a desired location on the back plate.

2. The rotating skewer rack of claim 1, wherein each protruding element is a rivet.

* * * * *